US012799313B2

(12) United States Patent
Lee et al.

(10) Patent No.: US 12,799,313 B2
(45) Date of Patent: Nov. 17, 2026

(54) RUBBER PROCESS OIL AND RUBBER COMPOSITION INCLUDING SAME

(71) Applicant: DL Chemical CO., LTD., Seoul (KR)

(72) Inventors: Hyeung Jin Lee, Daejeon (KR); Jin Hoon Ju, Daejeon (KR)

(73) Assignee: DL Chemical CO., LTD., Seoul (KR)

( * ) Notice: Subject to any disclaimer, the term of this patent is extended or adjusted under 35 U.S.C. 154(b) by 720 days.

(21) Appl. No.: 18/129,325

(22) Filed: Mar. 31, 2023

(65) Prior Publication Data

US 2023/0357551 A1 Nov. 9, 2023

(30) Foreign Application Priority Data

May 4, 2022 (KR) ........................ 10-2022-0055162

(51) Int. Cl.

| | |
|---|---|
| ***C08K 5/134*** | (2006.01) |
| ***C08K 5/20*** | (2006.01) |
| ***C08K 5/521*** | (2006.01) |
| ***C08L 23/0807*** | (2025.01) |
| ***C08L 23/16*** | (2006.01) |
| ***C08L 91/00*** | (2006.01) |

(52) U.S. Cl.

CPC .............. *C08L 23/16* (2013.01); *C08K 5/134* (2013.01); *C08K 5/20* (2013.01); *C08K 5/521* (2013.01); *C08L 23/0815* (2013.01); *C08L 91/00* (2013.01); *C08L 2205/025* (2013.01); *C08L 2205/035* (2013.01); *C08L 2207/322* (2013.01); *C08L 2207/324* (2013.01); *C08L 2310/00* (2013.01)

(58) Field of Classification Search

CPC .......... C08K 5/134; C08K 5/20; C08K 5/521; C08L 23/16; C08L 23/0815; C08L 91/00; C08L 2205/025; C08L 2205/035; C08L 2207/322; C08L 2207/324; C08L 2310/00

USPC .......................................................... 524/145

See application file for complete search history.

(56) References Cited

U.S. PATENT DOCUMENTS

| | | | | |
|---|---|---|---|---|
| 4,069,190 A * | 1/1978 | Vostovich | ............ | C08K 5/5425 428/390 |
| 2016/0122507 A1 | 5/2016 | Cox | | |
| 2020/0277540 A1* | 9/2020 | Lee | ...................... | C10M 137/12 |
| 2020/0277543 A1* | 9/2020 | Lee | .................... | C10M 137/105 |

FOREIGN PATENT DOCUMENTS

| | | | |
|---|---|---|---|
| CA | 1339967 | C | 7/1998 |
| CN | 102443242 | A | 5/2012 |
| CN | 105670534 | A | 6/2016 |
| CN | 105733781 | A | 7/2016 |
| CN | 109134765 | A | 1/2019 |
| CN | 109628017 | A | 4/2019 |
| CN | 114195916 | A | 3/2022 |
| JP | 2-49042 | A | 2/1990 |
| JP | 5-4307 | A | 1/1993 |
| JP | 2000-72924 | A | 3/2000 |
| JP | 2004-10775 | A | 1/2004 |
| JP | 2008-546890 | A | 12/2008 |
| JP | 2009046636 | A * | 3/2009 |
| JP | 2009-235241 | A | 10/2009 |
| JP | 2018-501344 | A | 1/2018 |
| JP | 2018-525504 | A | 9/2018 |
| JP | 2020-139140 | A | 9/2020 |
| KR | 10-1012890 | B1 | 2/2011 |
| KR | 10-1363718 | B1 | 2/2014 |
| KR | 10-2017-0095210 | A | 8/2017 |
| KR | 10-2138751 | B1 | 7/2020 |
| WO | 2021/188528 | A1 | 9/2021 |

OTHER PUBLICATIONS

Japanese Office Action issued Apr. 23, 2024 in Application No. 2023-054603.
Office Action issued Apr. 30, 2025 in Chinese Patent Application No. 202310405019.3.

* cited by examiner

*Primary Examiner* — Kelechi C Egwim

(74) *Attorney, Agent, or Firm* — Sughrue Mion, PLLC

(57) ABSTRACT

Proposed is a rubber process oil including a base oil, a liquid olefin copolymer prepared by copolymerization of ethylene with an alpha-olefin having 3 to 20 carbon atoms, polyisobutylene, and one or more additives selected from among alkylated phosphonium phosphate compounds and butylhydroxybenzene-based compounds. A rubber composition including the rubber process oil is also proposed.

11 Claims, No Drawings

RUBBER PROCESS OIL AND RUBBER COMPOSITION INCLUDING SAME

CROSS REFERENCE TO RELATED APPLICATION

The present application claims priority to Korean Patent Application No. 10-2022-0055162, filed May 4, 2022, the entire contents of which is incorporated herein for all purposes by this reference.

BACKGROUND OF THE INVENTION

1. Field of the Invention

The present invention relates to a rubber process oil and a rubber composition including the same.

2. Description of the Related Art

Ethylene-propylene diene monomer (EPDM) and styrene-ethylene/butylene-styrene (SEBS) are types of rubber commonly used in industrial applications. In particular, EPDM is prepared by copolymerization of ethylene, propylene, and ethylene norbonene (ENB) which enables cross-linkable double bonds. Due to its excellent weathering and ozone resistance, it is widely used for weatherstrips in automobiles and for rubber components in household appliances and machinery.

To make rubber products using EPDM/SEBS, a rubber composition capable of giving the desired mechanical properties must to be designed, and semi-finished rubber products (intermediates) need to be then made through rubber compounding. In general, to prepare a compounded rubber, additives such as reinforcing agents, oils, antioxidants, activators, crosslinkers, accelerators, adhesives, and processing aids are used. The compounded rubber may be shaped into a predetermined shape through a process such as extrusion or rolling, and the shaped object may undergo crosslinking with the application of heat and pressure to become a rubber product.

Rubber products have a unique characteristic that they deform and return to the original shapes, so that the rubber products are used to support bridges and buildings and to absorb vibrations thereof. In addition, rubber products are mounted between moving mechanical devices to prevent noise and vibration.

A large amount of filler is used to satisfy the required mechanical properties of rubber products used in various applications. When reinforcing agents such as carbon black or silica are used in an excessive amount, the viscosity becomes excessively high, thereby hindering rubber compounding. In addition, rubber wetting is deteriorated, which makes the obtained rubber products crumble. In this case, it is difficult to satisfy the required mechanical properties of rubber products.

In this case, to facilitate rubber compounding, oils can be used in an appropriate amount. However, there is a limitation to the usage of oils. When oils are excessively added, rubber compounding is facilitated, but the mechanical properties of the resulting rubber products are degraded and become different from the designed properties. This affects product performance.

In addition, since oils have lower molecular weights than rubbers, the oils may be released into the air or diffuse into the surrounding rubber compound where the oil content is relatively low, resulting in that the remaining amount of oil decreases over time. This is one of the causes of changing the mechanical properties of rubber and is a type of rubber aging.

Therefore, it is necessary to develop a technology that can facilitate rubber compounding processability and extrusion and rolling processability while using a less amount of oil and can enhance the mechanical properties of rubber without causing the loss of oils added.

Korean Patent No. 10-1363718 discloses a related art.

LITERATURE OF RELATED ART

Patent Literature

Korean Patent No. 10-1363718 (Feb. 10, 2014)

SUMMARY OF THE INVENTION

An objective of the present invention is to provide a rubber process oil that can facilitate rubber compounding without an increase in usage thereof compared to conventional process oils, can improve the mechanical properties of rubber, and can inhibit a phenomenon in which the remaining amount of the process oil is reduced during the manufacture of rubber.

Another objective of the present invention is to provide a rubber composition including the same rubber process oil.

In a first aspect of the present invention, there is provided a rubber process oil including: a base oil, a liquid olefin copolymer prepared by copolymerization of ethylene with an alpha-olefin having 3 to 20 carbon atoms, polyisobutylene, and one or more additives selected from among alkylated phosphonium phosphate compounds and butylhydroxybenzene-based compounds.

In the first aspect, the rubber process oil may include 1% to 80% by weight of the base oil, 1% to 80% by weight of the liquid olefin copolymer, 10% to 50% by weight of the polyisobutylene, and 0.01% to 3% by weight of the one or more additives.

In the first aspect, the liquid olefin copolymer may be composed of 40% to 60% by mole of ethylene units and 60% to 40% by mole of alpha-olefin units having 3 to 20 carbon atoms.

In the first aspect, the polyisobutylene may have a number-average molecular weight of 500 to 6,000 g/mol.

In the first aspect, the alkylated phosphonium phosphate compound may satisfy Formula 1 shown below.

[Formula 1]

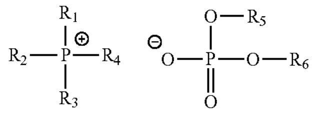

In Formula 1, $R_1$ to $R_6$ are each independently a linear or branched alkyl group having 1 to 20 carbon atoms.

In the first aspect, the alkylated phosphonium phosphate compound may be one or more selected from among tetraoctyl phosphonium bis(2-ethylhexyl) phosphate, tributyltetradecyl phosphonium bis(2-ethylhexyl) phosphate, tetraethyl phosphonium bis(2-ethylhexyl) phosphate, and tributyltetradecyl phosphonium bis(2-ethylhexyl) phosphate.

In the first aspect, the butylhydroxybenzene-based compound may be one or more selected from among N,N'-

(hexane-1,6-diyl) bis[3-(3,5-di-t-butyl-4-hydroxyphenyl) propanamide, pentaerythritol tetrakis(3,5-di-t-butyl-4-hydroxyhydrocinnamate), alkyl-t-butylhydroxyhydrocinnamate, alkyl-3,5-di-t-butyl-4-hydroxyhydrocinnamate, and t-butylhydroanisole.

In a second aspect of the present invention, there is provided a rubber including the rubber process oil described above.

In the second aspect, the rubber composition may include 80 to 200 parts by weight of the rubber process oil per 100 parts by weight of rubber.

In the second aspect, the rubber composition may further include diene-based rubber, in which the diene-based rubber may be one or more selected from among ethylene propylene diene (EPDM) rubber, butadiene rubber, natural rubber (NR), isoprene rubber, styrene butadiene rubber (SBR), nitrile rubber (NBR), isobutene-isoprene rubber (IIR), and chloroprene rubber (CR).

Since the rubber process oil according to the present invention includes not only a base oil but also a liquid olefin copolymer, polyisobutylene, and one or more additives selected from among alkylated phosphonium phosphate compounds and butyl hydroxybenzene-based compounds, the rubber process oil according to the present invention is advantageous in terms of facilitating rubber compounding and improving the mechanical properties of rubber without increasing the usage of the rubber process oil as compared to the cases of using conventional process oils.

DESCRIPTION OF THE PREFERRED EMBODIMENTS

The advantages and features of embodiments of the present invention will be clearly understood from the following description of preferred examples. The present invention may, however, be embodied in many different forms and should not be construed as being limited to the embodiments or examples set forth herein. Rather, these embodiments or examples are provided so that the present invention will be thorough and complete and will fully convey the concept of the invention to those skilled in the art. Thus, the present invention will be defined only by the scope of the appended claims. Like numbers refer to like elements throughout the following description herein.

Further, in describing embodiments or examples of the present invention, well-known functions or constructions will not be described in detail since they may unnecessarily obscure the gist of the present invention. The following terms are defined in consideration of the functions in the embodiments or examples of the present invention and thus may vary depending on the intentions of users, operators, or the like. Therefore, the definition of each term should be interpreted on the basis of the contents throughout this specification.

A first aspect of the present invention relates to a rubber process oil including: a base oil; a liquid olefin copolymer prepared by copolymerization of ethylene with an alpha-olefin having 3 to 20 carbon atoms; polyisobutylene; and one or more additives selected from among alkylated phosphonium phosphate compounds and butylhydroxybenzene-based compounds.

Since the rubber process oil according to the present invention includes not only a base oil but also a liquid olefin copolymer, polyisobutylene, and one or more additives selected from among alkylated phosphonium phosphate compounds and butyl hydroxybenzene-based compounds, the rubber process oil according to the present invention is advantageous in terms of facilitating rubber compounding and improving the mechanical properties of rubber without increasing the usage thereof as compared to the cases of using conventional process oils.

To this end, the content of each component of the process oil needs to be appropriately controlled. For example, the rubber process oil includes 1% to 80% by weight of the base oil, 1% to 80% by weight of the liquid olefin copolymer, 10% to 50% by weight of the polyisobutylene copolymer, and 0.01% to 3% by weight of the one or more additives. More preferably, the rubber process oil includes 5% to 60% by weight of the base oil, 20% to 80% by weight of the liquid olefin copolymer, 12% to 40% by weight of the polyisobutylene copolymer, and 0.05% to 2% by weight of the one or more additives. Most preferably, the rubber process oil includes 20% to 45% by weight of the base oil, 35% to 45% by weight of the liquid olefin copolymer, 15% to 35% by weight of the polyisobutylene copolymer, and 0.1% to 1.5% by weight of the one or more additives. When the content of each component is in the range described above, the effect of facilitating rubber compounding is excellent, and the mechanical properties of rubber can be improved. In the case that the content of each component is outside the range, the effect of facilitating rubber compounding may be insignificant or the mechanical properties of rubber may be degraded.

Hereinafter, a process oil according to one embodiment of the present invention will be described.

First, in one embodiment, as the base oil, any base oil can be used without limitation if it is commonly used in the art to which the present invention pertains although base oils differ in viscosity, heat resistance, oxidation stability, and the like depending on manufacturing methods and refinement methods. In general, the base oils are classified into Group I, II, III, IV, and IV by the American Petroleum Institute (API). These API categories are specified in API Publication 1509, 15th Edition, Appendix E, April 2002, as shown in Table 1 below.

TABLE 1

| | Saturated hydrocarbons (%) | Sulfur (%) | Viscosity index (VI) |
|---|---|---|---|
| Group I | <90 | >0.03 | 80 ≤ VI < 120 |
| Group II | ≥90 | ≤0.03 | 80 ≤ VI < 120 |
| Group III | ≥90 | ≤0.03 | VI ≥ 120 |
| Group IV | Poly alpha olefin (PAO) | | |
| Group V | Ester & others | | |

The base oil used in the present embodiment may be any one of Group I to V base oils categorized by the American Petroleum Institute (API). The base oil suitable for the present invention belongs to any one of Group I to III of the API categories described above, and "saturated hydrocarbons" may refer to paraffinic and naphthenic compounds. Paraffinic compounds may be branched or linear, and naphthenic compounds may be cyclic saturated hydrocarbons such as cycloparaffins. The cyclic saturated hydrocarbons are typically derivatives of cyclopentane or cyclohexane. Naphthenic compounds are single ring structures (mononaphthene) or two isolated ring structures (isolated dinaphthene), or two fused ring structures (fused dinaphthene) or three or more fused ring structures (multicyclic naphthenes or polynaphthenes).

According to one embodiment of the present invention, the liquid olefin copolymer is used to facilitate the wetting of a reinforcing agent during rubber compounding. The shearing force of a mixer is transferred to rubber so that the rubber and the reinforcing agent can be well mixed. The liquid olefin copolymer produced by the copolymerization of ethylene and an alpha-olefin having 3 to 20 carbon atoms exhibits different properties from mineral oils such as naphthenic oils and paraffinic oils. The liquid olefin copolymer is similar in composition to EPDM/SEBS rubbers, is well miscible with rubber than mineral oils, and can reduce the viscosity of compounded rubbers. These advantages contribute to the reduction of power consumption during the extrusion or rolling process, and to the production of rubber products having the desired dimensions. The better the dimensional stability of rubber products, the lower the manufacturing cost because the defective rate decreases.

The liquid olefin copolymer may be prepared by copolymerizing ethylene and alpha-olefin monomers in the presence of a single-site catalyst system to uniformly distribute alpha-olefin units in copolymer chains. Preferably, the liquid olefin copolymer may be prepared by reacting ethylene and alpha-olefin monomers in the presence of a single-site catalyst system containing a cross-linked metallocene compound, an organometallic compound, and an ionic compound reacting with the cross-linked metallocene compound to form ion pairs.

The alpha-olefin monomers used along with ethylene in the preparation of the liquid olefin copolymer include aliphatic olefins having 3 to 20 carbon atoms. Specifically, one or more aliphatic olefins selected from among propylene, 1-butene, 1-pentene, 3-methyl-1-butene, 1-hexene, 4-methyl-1-pentene, 3-methyl-1-pentene, 1-heptene, 1-octene, 1-decene, 1-dodecene, 1-tetradecene, and isomers thereof may be used, but the alpha-olefin monomers used in the invention are not limited thereto. Preferably, the alpha-olefin monomers may be one or more alpha-olefins having 3 to 6 carbon atoms. Most preferably, the alpha-olefin monomers may be propylene.

Preferably, the liquid olefin copolymer suitable for the present invention may be made of 40% to 60% by mole of ethylene units and 60% to 40% by mole of alpha-olefin units having 3 to 20 carbon atoms. The use of the liquid olefin copolymer having the composition range is good for improving processability and improving mechanical properties. On the other hand, when the ethylene units are contained in an amount of less than 40% by mole or greater than 60% by mole, the effect of improving processability may be insignificant or the mechanical properties of the compounded rubber may be degraded.

The liquid olefin copolymer may have a number-average molecular weight (Mn) of 500 to 10,000 g/mol, a molecular weight distribution (Mw/Mn, wherein Mw is a weight-average molecular weight) of 3 or less, and a kinematic viscosity of 30 to 5,000 cSt at 100° C.

In one embodiment of the present invention, the polyisobutylene is a polymer in which the main chain is isobutylene. When both of the liquid olefin copolymer and the polyisobutylene are added to the base oil, both of the breaking strength of rubber and the elongation at break can be improved. In the case of EPDM/SEBS rubbers, wear phenomena that result in fine tearing due to repeated stress on the soft metal surface may occur. When the rubber process oil including both the liquid olefin copolymer and the polyisobutylene, according to the present invention, is added to a base rubber for rubber compounding, the rubber breaking strength and the elongation at break are both improved, which contributes to an improvement in abrasion performance. In addition, it is possible to inhibit the oil from escaping into the air or from diffusing into the surrounding rubber, thereby inhibiting the reduction of oil in the compounded rubber. This prevents the rubber aging phenomenon caused by the loss of oil and suppresses the permanent deformation which means that the rubber does not recover to the original shape after experiencing repeated deformations.

The polyisobutylene suitable for the present invention has a number-average molecular weight of 500 to 6,000 g/mol, preferably 1,000 to 4,000 g/mol, and most preferably 1,500 to 3,000 g/mol, and a molecular weight distribution (PI) of 1 to 5 and preferably 1 to 3. In addition, the kinematic viscosity at 100° C. may be preferably in the range of from 2 to 10,000 cSt, more preferably 100 to 5,000 cSt, and most preferably 1,000 to 3,000 cSt.

The additive used in one embodiment of the present invention is added for friction reduction and antioxidant effects. As described above, the additive may be one or more compounds selected from among alkylated phosphonium phosphate compounds and butylhydroxybenzene-based compounds.

The alkylated phosphonium phosphate compounds may be compounds satisfying Formula 1 shown below and may be one or more selected from among tetraoctyl phosphonium bis(2-ethylhexyl) phosphate, tributyltetradecyl phosphonium bis(2-ethylhexyl) phosphate, tetraethyl phosphonium bis(2-ethylhexyl) phosphate, and tributyltetradecyl phosphonium bis(2-ethylhexyl) phosphate.

[Formula 1]

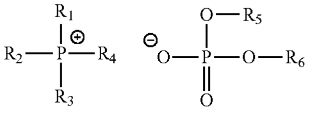

In Formula 1, $R_1$ to $R_6$ are each independently a linear or branched alkyl group having 1 to 20 carbon atoms.

The butylhydroxybenzene-based compounds may be compounds containing a butylhydroxybenzene group. Specifically, the butylhydroxybenzene-based compounds may be one or more compounds selected from among N,N'-(hexane-1,6-diyl) bis[3-(3,5-di-t-butyl-4-hydroxyphenyl) propanamide, pentaerythritol tetrakis(3,5-di-t-butyl-4-hydroxyhydrocinnamate), alkyl-t-butylhydroxyhydrocinnamate, alkyl-3,5-di-t-butyl-4-hydroxyhydrocinnamate, and t-butylhydroanisole. In this case, the alkyl is an alkyl group having 1 to 20 carbon atoms, and the alkyl may be linear or branched.

In addition, a second aspect of the present invention relates to a rubber composition including the rubber process oil according to the first aspect. In more detail, the rubber composition includes a rubber, the rubber process oil, and a filler.

Since the rubber process oil used herein is the same as described above, a redundant description about the rubber process oil will be omitted. The rubber composition preferably includes 80 to 200 parts by weight of the rubber process oil per 100 parts by weight of the rubber. More preferably, the rubber composition includes 100 to 180 parts by weight of the rubber process oil per 100 parts by weight of the rubber. When the rubber process oil is used in an amount within the range described above, the processability improvement effect is good, and the mechanical properties of a compounded rubber can be improved.

On the other hand, the rubber that can be used in one embodiment of the present invention is not particularly limited if it is anyone that is commonly used in the art to which the present invention pertains. Specifically, the rubber may be a diene-based rubber. Specifically, the diene-based rubber may be one or more selected from among an ethylene propylene diene (EPDM) rubber, a butadiene rubber, a natural rubber, an isoprene rubber, a styrene butadiene rubber (SBR), a nitrile rubber (NBR), an isobutene-isoprene rubber (IIR), and a chloroprene rubber (CR). Derivatives of such rubbers may also be used. For example, polybutadiene rubbers modified with tin compounds may be used. Alternatively, epoxy modified rubbers, silane modified rubbers, or maleic acid modified rubbers may be used solely or in combination.

The filler according to one embodiment of the present invention may be silica, carbon black, white carbon, carbon nanotubes, clay, talc, or any mixture thereof. Preferably, the filler may be carbon black. The content of the filler may be in the range of from 10 to 150 parts by weight, more preferably in the range of from 30 to 120 parts by weight, and most preferably in the range of from 50 to 100 parts by weight, per 100 parts by weight of the rubber.

In addition, the rubber composition may further include one or more blending components selected from vulcanizing agents, vulcanizing accelerators, zinc oxide, and stearic acid, which are commonly used in the rubber industry, depending on the use and need. For example, the vulcanizing agent may be one or more selected from among sulfur (free sulfur), amine disulfide, polymeric polysulfide, and sulfur olefin adducts. The vulcanizing accelerator may be one or more selected from among: benzothiazole-based accelerators such as 2-mercapto benzothiazole, dibenzotazyl disulfide, sodium-2-mercapto benzothiazole, zinc salt-2-mercapto benzothiazole, cyclohexylamine salt-2-mercapto benzothiazole, N-cyclohexyl-2-benzothiazole sulfenamide, N-tert-butyl-2-benzothiazole sulfenamide, or N-oxydiethylene-2-benzothiazole sulfenamide; and thiuram-based accelerators such as tetramethylthiuram monosulfide, tetramethylthiuram disulfide, tetraethylthiuram disulfide, tetrabutylthiuram disulfide or dipentamethylenethiuram disulfide. Each of the blending components may be added in an amount of 0.1 to 10 parts by weight per 100 parts by weight of the rubber, but may not be limited thereto.

Hereinafter, the present invention will be described in more detail with reference to examples and comparative examples. The following examples are merely to aid understanding of the present invention. The scope of the present invention is not limited by the examples described below, and herein, otherwise specified, "%" means "% by weight".

Examples 1 and 15 and Comparative Examples 1 to 16

Process oils were prepared by mixing a paraffin oil, a naphthenic oil, a liquid olefin copolymer (having a number-average molecular weight (Mn) of 7800 g/mol and an ethylene content of 50 mol %), polyisobutylene (PIB) (manufactured by Daelim Co., Ltd., PB2000, Mn: 2180 g/mol, kinematic viscosity at 100° C.: 2200 to 2400 cSt) and additives according to the amounts (% by weight) described in Table 2 below.

In this case, the abbreviations in Table 2 refer to additives, respectively.

TPEP: tetraoctylphosphonium bis(2-ethylhexyl)phosphate

TBPEHP: tributyltetradecylphosphonium bis(2-ethylhexyl)phosphate

TEPEHP: tetraethylphosphonium bis(2-ethylhexyl)phosphate

BHC: octyl-3,5-di-tert-butyl-4-hydroxyhydrocinnamate

BHPPA: N,N'-(hexane-1,6-diyl) bis[3-(3,5-di-tert-butyl-4-hydroxyphenyl) propanamide]

TABLE 2

| | Base oil | | Liquid | | | |
|---|---|---|---|---|---|---|
| (wt %) | Paraffin oil | Naphthenic oil | co-polymer olefin | PIB | Additive Type | Content |
| Preparation Example 1 | 7.69 | 0 | 75.13 | 16.67 | TPEP | 0.51 |
| Preparation Example 2 | 26.58 | 0 | 39.64 | 33.11 | | 0.67 |
| Preparation Example 3 | 55.78 | 0 | 23.87 | 20.10 | | 0.25 |
| Preparation Example 4 | 39.85 | 0 | 39.85 | 19.80 | TBPEHP | 0.50 |
| Preparation Example 5 | 25.65 | 0 | 59.95 | 13.61 | | 0.79 |
| Preparation Example 6 | 29.42 | 0 | 44.26 | 25.84 | TEPEHP | 0.48 |
| Preparation Example 7 | 15.79 | 0 | 63.66 | 19.80 | | 0.75 |
| Preparation Example 8 | 39.85 | 0 | 39.85 | 19.80 | BHC | 0.50 |
| Preparation Example 9 | 74.36 | 0 | 8.20 | 16.67 | | 0.77 |
| Preparation Example 10 | 82.69 | 0 | 10.89 | 5.84 | | 0.58 |
| Preparation Example 11 | 56.91 | 0 | 0.81 | 39.87 | | 2.41 |
| Preparation Example 12 | 7.03 | 0 | 63.93 | 28.34 | BHPPA | 0.70 |
| Preparation Example 13 | 0 | 14.285 | 70.96 | 14.285 | | 0.47 |
| Preparation Example 14 | 0 | 46.73 | 19.86 | 33.18 | TBPEHP | 0.23 |
| Preparation Example 15 | 44.11 | 16.83 | 0.48 | 38.46 | BHC | 0.12 |

TABLE 2-continued

| (wt %) | Base oil: Paraffin oil | Base oil: Naphthenic oil | Liquid co-polymer olefin | PIB | Additive Type | Content |
|---|---|---|---|---|---|---|
| Comparative Preparation Example 1 | 0 | 0 | 97.67 | 2.33 | — | 0 |
| Comparative Preparation Example 2 | 99.14 | 0 | 0 | 0.86 | — | 0 |
| Comparative Preparation Example 3 | 0 | 98.01 | 0 | 1.99 | — | 0 |
| Comparative Preparation Example 4 | 89.40 | 9.74 | 0 | 0.86 | — | 0 |
| Comparative Preparation Example 5 | 63.91 | 16.04 | 0 | 20.05 | — | 0 |
| Comparative Preparation Example 6 | 58.35 | 24.94 | 0 | 16.71 | — | 0 |
| Comparative Preparation Example 7 | 96.33 | 0 | 0 | 0.85 | TBPEHP | 2.82 |
| Comparative Preparation Example 8 | 0 | 93.37 | 0 | 1.93 | TEPEHP | 4.70 |
| Comparative Preparation Example 9 | 39.93 | 39.93 | 0 | 20.09 | | 0.05 |
| Comparative Preparation Example 10 | 83.98 | 9.39 | 0 | 2.76 | | 3.87 |
| Comparative Preparation Example 11 | 60.08 | 39.86 | 0 | 0 | BHPPA | 0.06 |
| Comparative Preparation Example 12 | 77.84 | 19.32 | 0 | 0 | | 2.84 |
| Comparative Preparation Example 13 | 69.90 | 30.04 | 0 | 0 | BHC | 0.06 |
| Comparative Preparation Example 14 | 66.67 | 28.57 | 0 | 0 | | 4.76 |
| Comparative Preparation Example 15 | 77.97 | 19.21 | 0 | 0 | TPEP | 2.82 |
| Comparative Example 16 | 48.03 | 48.03 | 0 | 0 | TPEP | 1.97 |
| Preparation | | | | | TEPEHP | 1.97 |

Examples 1 and 15 and Comparative Examples 1 to 16

Compounded rubbers were prepared by mixing the rubber process oil, EPDM (manufactured by Geumho Polychem Co., Ltd., KEP980N, ethylene content: 71% by weight, ENB content: 4.5% by weight, Mooney viscosity (ML(1+8) at 125° C.): 58), carbon black (CB), zinc oxide (ZnO), stearic acid (SA), sulfur, tetramethylthiuram disulfide (TMTD), and 2,2'-dibenzothiazyl disulfide (MBTS) according to the amounts (% by weight) described in Table 3 below.

TABLE 3

| (wt %) | Process oil: Type | Process oil: Content | EPDM | CB | ZnO | SA | Sulfur | TMTD | MBTS |
|---|---|---|---|---|---|---|---|---|---|
| Example 1 | Preparation Example 1 | 39.0 | 32.3 | 25.8 | 1.6 | 0.3 | 0.5 | 0.3 | 0.2 |
| Example 2 | Preparation Example 2 | 44.4 | 29.5 | 23.5 | 1.5 | 0.3 | 0.4 | 0.3 | 0.1 |
| Example 3 | Preparation Example 3 | 39.8 | 31.8 | 25.5 | 1.6 | 0.3 | 0.5 | 0.3 | 0.2 |
| Example 4 | Preparation Example 4 | 39.9 | 31.8 | 25.4 | 1.6 | 0.3 | 0.5 | 0.3 | 0.2 |

TABLE 3-continued

| | Process oil | | | | | | | | |
|---|---|---|---|---|---|---|---|---|---|
| (wt %) | Type | Content | EPDM | CB | ZnO | SA | Sulfur | TMTD | MBTS |
| Example 5 | Preparation Example 5 | 38.2 | 32.8 | 26.1 | 1.6 | 0.3 | 0.5 | 0.3 | 0.2 |
| Example 6 | Preparation Example 6 | 41.8 | 30.8 | 24.6 | 1.5 | 0.3 | 0.5 | 0.3 | 0.2 |
| Example 7 | Preparation Example 7 | 39.9 | 31.8 | 25.4 | 1.6 | 0.3 | 0.5 | 0.3 | 0.2 |
| Example 8 | Preparation Example 8 | 39.9 | 31.8 | 25.4 | 1.6 | 0.3 | 0.5 | 0.3 | 0.2 |
| Example 9 | Preparation Example 9 | 39.0 | 32.3 | 25.8 | 1.6 | 0.3 | 0.5 | 0.3 | 0.2 |
| Example 10 | Preparation Example 10 | 51.4 | 29.1 | 16.6 | 1.6 | 0.3 | 0.5 | 0.3 | 0.2 |
| Example 11 | Preparation Example 11 | 62.2 | 21.5 | 13.4 | 1.6 | 0.3 | 0.5 | 0.3 | 0.2 |
| Example 12 | Preparation Example 12 | 42.7 | 30.3 | 24.2 | 1.5 | 0.3 | 0.5 | 0.3 | 0.2 |
| Example 13 | Preparation Example 13 | 42.7 | 30.3 | 24.2 | 1.5 | 0.3 | 0.5 | 0.3 | 0.2 |
| Example 14 | Preparation Example 14 | 44.3 | 29.5 | 23.6 | 1.5 | 0.3 | 0.4 | 0.3 | 0.1 |
| Example 15 | Preparation Example 15 | 41.6 | 32.4 | 23.0 | 1.7 | 0.3 | 0.5 | 0.3 | 0.2 |
| Comparative Example 1 | Comparative Preparation Example 1 | 43.0 | 29.4 | 24.6 | 1.7 | 0.3 | 0.5 | 0.3 | 0.2 |
| Comparative Example 2 | Comparative Preparation Example 2 | 34.9 | 34.5 | 27.6 | 1.7 | 0.3 | 0.5 | 0.3 | 0.2 |
| Comparative Example 3 | Comparative Preparation Example 3 | 35.1 | 34.4 | 27.5 | 1.7 | 0.3 | 0.5 | 0.3 | 0.2 |
| Comparative Example 4 | Comparative Preparation Example 4 | 34.9 | 34.5 | 27.6 | 1.7 | 0.3 | 0.5 | 0.3 | 0.2 |
| Comparative Example 5 | Comparative Preparation Example 5 | 39.9 | 31.8 | 25.4 | 1.6 | 0.3 | 0.5 | 0.3 | 0.2 |
| Comparative Example 6 | Comparative Preparation Example 6 | 38.9 | 32.4 | 25.8 | 1.6 | 0.3 | 0.5 | 0.3 | 0.2 |
| Comparative Example 7 | Comparative Preparation Example 7 | 35.4 | 34.3 | 27.3 | 1.7 | 0.3 | 0.5 | 0.3 | 0.2 |
| Comparative Example 8 | Comparative Preparation Example 8 | 36.2 | 33.8 | 27.0 | 1.7 | 0.3 | 0.5 | 0.3 | 0.2 |
| Comparative Example 9 | Comparative Preparation Example 9 | 39.82 | 31.8 | 25.5 | 1.6 | 0.3 | 0.5 | 0.3 | 0.18 |
| Comparative Example 10 | Comparative Preparation Example 10 | 36.2 | 33.8 | 27.0 | 1.7 | 0.3 | 0.5 | 0.3 | 0.2 |
| Comparative Example 11 | Comparative Preparation Example 11 | 34.62 | 34.6 | 27.8 | 1.7 | 0.3 | 0.5 | 0.3 | 0.18 |
| Comparative Example 12 | Comparative Preparation Example 12 | 35.2 | 34.2 | 27.6 | 1.7 | 0.3 | 0.5 | 0.3 | 0.2 |
| Comparative Example 13 | Comparative Preparation Example 13 | 34.62 | 34.7 | 27.7 | 1.7 | 0.3 | 0.5 | 0.3 | 0.18 |
| Comparative Example 14 | Comparative Preparation Example 14 | 35.7 | 34.1 | 27.2 | 1.7 | 0.3 | 0.5 | 0.3 | 0.2 |
| Comparative Example 15 | Comparative Preparation Example 15 | 35.4 | 34.2 | 27.4 | 1.7 | 0.3 | 0.5 | 0.3 | 0.2 |
| Comparative Example 16 | Comparative Preparation Example 16 | 35.6 | 34.1 | 27.3 | 1.7 | 0.3 | 0.5 | 0.3 | 0.2 |

[Evaluation of Properties]

Properties were evaluated according to methods described below. The Rheo test result, Mooney viscosity, and tensile properties are expressed as indexes. The higher the index, the better the physical property.

1) Rheo test at 160° C.: measured according to ASTM D5289.

2) Mooney viscosity (ML (1+4) at 100° C.): measured according to ASTM D1646. The Mooney viscosity is an index indicating the viscosity of rubber. The higher the level, the lower the viscosity and the better the processability.

3) Permanent compression set (CSET) (%): measured according to ASTM D395. The permanent compression set indicates the mechanical strength of rubber. The lower the level, the less deformation occurs by compression.

4) Tensile properties: Breaking strength and elongation at break were measured according to ASTM D412. The tensile properties indicate the mechanical strength of rubber. The higher the index, the better the mechanical strength. [Table 4]

TABLE 4

| | Rheo (at 160° C.) | | Mooney | CSET | Tensile properties | |
|---|---|---|---|---|---|---|
| | T50 | T90 | viscosity | (%) | Strength | Elongation |
| Example 1 | 104 | 102 | 152 | 10.92 | 159 | 169 |
| Example 2 | 106 | 103 | 153 | 10.22 | 169 | 171 |
| Example 3 | 102 | 104 | 150 | 11.22 | 164 | 153 |
| Example 4 | 104 | 102 | 157 | 10.99 | 154 | 157 |
| Example 5 | 103 | 102 | 155 | 10.12 | 150 | 159 |
| Example 6 | 104 | 102 | 152 | 10.88 | 159 | 170 |
| Example 7 | 103 | 102 | 151 | 10.55 | 153 | 157 |
| Example 8 | 105 | 103 | 150 | 10.22 | 157 | 169 |
| Example 9 | 102 | 104 | 152 | 10.09 | 153 | 152 |
| Example 10 | 98 | 95 | 94 | 10.56 | 90 | 88 |
| Example 11 | 96 | 94 | 95 | 10.99 | 88 | 79 |
| Example 12 | 103 | 102 | 150 | 10.71 | 155 | 160 |
| Example 13 | 105 | 103 | 154 | 10.88 | 150 | 155 |
| Example 14 | 102 | 103 | 153 | 11.88 | 155 | 154 |
| Example 15 | 92 | 90 | 89 | 11.10 | 90 | 85 |
| Comparative Example 1 | 96 | 94 | 91 | 45.75 | 93 | 90 |
| Comparative Example 2 | 100 | 100 | 98 | 28.87 | 100 | 98 |
| Comparative Example 3 | 100 | 100 | 100 | 29.99 | 101 | 96 |
| Comparative Example 4 | 100 | 101 | 99 | 29.12 | 100 | 96 |
| Comparative Example 5 | 100 | 99 | 95 | 30.55 | 100 | 101 |
| Comparative Example 6 | 100 | 98 | 94 | 31.99 | 99 | 100 |
| Comparative Example 7 | 98 | 99 | 97 | 30.55 | 99 | 96 |
| Comparative Example 8 | 98 | 100 | 98 | 31.74 | 100 | 94 |
| Comparative Example 9 | 100 | 97 | 95 | 29.98 | 98 | 99 |
| Comparative Example 10 | 99 | 100 | 97 | 32.68 | 99 | 97 |
| Comparative Example 11 | 100 | 99 | 95 | 30.55 | 100 | 101 |
| Comparative Example 12 | 98 | 95 | 95 | 40.35 | 98 | 99 |
| Comparative Example 13 | 100 | 98 | 94 | 31.99 | 99 | 100 |
| Comparative Example 14 | 97 | 94 | 94 | 42.22 | 96 | 98 |
| Comparative Example 15 | 100 | 97 | 95 | 29.98 | 98 | 99 |
| Comparative Example 16 | 98 | 96 | 95 | 48.99 | 94 | 95 |

Referring to Tables 2 to 4, in the case of the examples in which a liquid olefin copolymer, a polyisobutylene, and one or more additives selected from alkylated phosphonium phosphate compounds and butyl hydroxybenzene-based compounds were mixed with a base oil to prepare a rubber process oil according to the present invention, it was found that the processability and mechanical properties of rubber were overall improved compared to the comparative examples in which one or more of the liquid olefin copolymer and the polyisobutylene were not added.

However, in the case of Examples 10, 11, and 15 in which the amount of the liquid olefin copolymer or polyisobutylene was relatively small, the effect of improving the processability was insignificant, or the mechanical properties of rubber were degraded.

Preparation Example 16

A process oil was prepared by mixing 36.68% by weight of a paraffin oil, 21.51% by weight of a naphthenic oil, 26.00% by weight of a liquid olefin copolymer (having a number-average molecular weight (Mn) of 7800 g/mol and an ethylene content of mol %), 15.7% by weight of polyisobutylene (PIB) (manufactured by Daelim Co., Ltd., PB2000, Mn: 2180 g/mol, kinematic viscosity at 100° C.: 2200 to 2400 cSt), and 0.11% by weight of BHC.

Preparation Example 17

A process oil was prepared by mixing 37.76% by weight of a paraffin oil, 16.52% by weight of a naphthenic oil, 25.50% by weight of a liquid olefin copolymer (having a number-average molecular weight (Mn) of 7800 g/mol and an ethylene content of 75 mol %), 20.1% by weight of polyisobutylene (PIB) (manufactured by Daelim Co., Ltd., PB2000, Mn: 2180 g/mol, and kinematic viscosity at 100° C.: 2200 to 2400 cSt), and 0.12% by weight of BHC.

Preparation Example 18

A process oil was prepared by mixing 67.63% by weight of a paraffin oil, 25.00% by weight of a liquid olefin copolymer (having a number-average molecular weight (Mn) of 7800 g/mol and an ethylene content of 70 mol %), 7.25% by weight of polyisobutylene (PIB) (manufactured by Daelim Co., Ltd., PB2000, Mn: 2180 g/mol, kinematic viscosity at 100° C.: 2200 to 2400 cSt), and 0.12% by weight of BHC.

Preparation Example 19

A process oil was prepared by mixing 42.68% by weight of a paraffin oil, 23.35% by weight of a naphthenic oil, 26.54% by weight of a liquid olefin copolymer (having a number-average molecular weight (Mn) of 7800 g/mol and an ethylene content of 30 mol %), 7.32% by weight of polyisobutylene (PIB) (manufactured by Daelim Co., Ltd., PB2000, Mn: 2180 g/mol, kinematic viscosity at 100° C.: 2200 to 2400 cSt), and 0.11% by weight of BHC.

TABLE 5

| | Base oil | | Liquid | | Additive | |
|---|---|---|---|---|---|---|
| (wt %) | Paraffin oil | Naphthenic oil | olefin copolymer | PIB | Type | Content |
| Preparation Example 16 | 36.68 | 21.51 | 26.00 | 15.70 | BHC | 0.11 |
| Preparation Example 17 | 37.76 | 16.52 | 25.50 | 20.10 | | 0.12 |
| Preparation Example 18 | 67.63 | 0 | 25.00 | 7.25 | | 0.12 |
| Preparation Example 19 | 42.68 | 23.35 | 26.54 | 7.32 | | 0.11 |

Example 16 to 19

Compounded rubbers were prepared by mixing a process oil, EPDM (manufactured by Geumho Polychem Co., Ltd., KEP980N, ethylene content: 71% by weight, ENB content: 4.5% by weight, Mooney viscosity (ML(1+8) at 125° C.): 58), carbon black (CB), zinc oxide (ZnO), stearic acid (SA), sulfur, tetramethylthiuram disulfide (TMTD), and 2,2'-dibenzothiazyl disulfide (MBTS) according to the amounts (% by weight) described in Table 6 below.

TABLE 6

| | Process oil | | | | | | | | |
|---|---|---|---|---|---|---|---|---|---|
| (wt %) | Type | Content | EPDM | CB | ZnO | SA | Sulfur | TMTD | MBTS |
| Example 16 | Preparation Example 16 | 41.4 | 30.1 | 25.6 | 1.6 | 0.3 | 0.5 | 0.3 | 0.2 |
| Example 17 | Preparation Example 17 | 47.1 | 29.5 | 20.5 | 1.6 | 0.3 | 0.5 | 0.3 | 0.2 |
| Example 18 | Preparation Example 18 | 41.4 | 30.1 | 25.6 | 1.6 | 0.3 | 0.5 | 0.3 | 0.2 |
| Example 19 | Preparation Example 19 | 47.1 | 29.5 | 20.5 | 1.6 | 0.3 | 0.5 | 0.3 | 0.2 |

[Evaluation of Properties]

The Rheo test, Mooney viscosity, permanent compression set, and tensile properties were evaluated according to methods described above, and the results are shown in Table 7.

TABLE 7

| | Rheo (at 160° C.) | | Mooney | CSET | Tensile properties | |
|---|---|---|---|---|---|---|
| | T50 | T90 | viscosity | (%) | Strength | Elongation |
| Example 8 | 105 | 103 | 150 | 10.22 | 157 | 169 |
| Example 16 | 101 | 99 | 100 | 13.89 | 100 | 98 |
| Example 17 | 100 | 98 | 99 | 15.55 | 99 | 100 |
| Example 18 | 100 | 98 | 99 | 12.47 | 95 | 95 |
| Example 19 | 101 | 99 | 99 | 11.87 | 99 | 100 |

Examples 8 and 16 to 19 are experimental examples in which liquid olefin copolymers that differ in ethylene content were added.

Among them, in the case of Example 8 in which a liquid olefin copolymer having an ethylene content in the range of from 40% to 60% by mole was used, the processability was excellent, the permanent compression set was 10.22%, and the tensile strength index was 157. That is, the mechanical properties were excellent.

On the other hand, in the cases of Examples 16 to 19 in which a liquid olefin copolymer having an ethylene content outside the range of from 40% to 60% by mole was used, the effects of improving the processability and mechanical properties were insignificant, or the processability and the mechanical properties were degraded.

What is claimed is:

1. A rubber process oil comprising:

a base oil;

a liquid olefin copolymer dissolvable in the base oil and prepared by copolymerization of ethylene with an alpha-olefin having 3 to 20 carbon atoms;

polyisobutylene; and one or more additives selected from alkylated phosphonium phosphate compounds and butylhydroxybenzene-based compounds, wherein the liquid olefin copolymer has a number-average molecular weight (Mn) of 500 to 10,000 g/mol, and wherein the rubber process oil comprises 35% to 45% by weight of the liquid olefin copolymer.

2. The rubber process oil of claim 1, wherein the rubber process oil comprises 1% to 80% by weight of the base oil, 10% to 50% by weight of the polyisobutylene, and 0.01% to 3% by weight of the one or more additives.

3. The rubber process oil of claim 1, wherein the liquid olefin copolymer comprises 40% to 60% by mole of ethylene units and 60% to 40% by mole of alpha-olefin units having 3 to 20 carbon atoms.

4. The rubber process oil of claim 1, wherein the polyisobutylene has a number-average molecular weight of 500 to 6,000 g/mol.

5. The rubber process oil of claim 1, wherein the alkylated phosphonium phosphate compounds satisfy Formula 1,

[Formula 1]

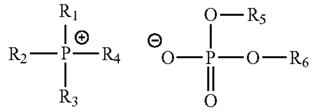

wherein in Formula 1, $R_1$ to $R_6$ are each independently a linear or branched alkyl group having 1 to 20 carbon atoms.

6. The rubber process oil of claim 5, wherein the alkylated phosphonium phosphate compound comprises one or more selected from among tetraoctyl phosphonium bis(2-ethylhexyl) phosphate, tributyltetradecyl phosphonium bis(2-ethylhexyl) phosphate, tetraethyl phosphonium bis(2-ethylhexyl) phosphate, and tributyltetradecyl phosphonium bis (2-ethylhexyl) phosphate.

7. The rubber process oil of claim 1, wherein the butylhydroxybenzene-based compound comprises one or more selected from among N,N'-(hexane-1,6-diyl) bis[3-(3,5-di-t-butyl-4-hydroxyphenyl) propanamide, pentaerythritol tetrakis(3,5-di-t-butyl-4-hydroxyhydrocinnamate), alkyl-t-butylhydroxyhydrocinnamate, alkyl-3,5-di-t-butyl-4-hydroxyhydrocinnamate, and t-butylhydroanisole.

8. A rubber composition comprising a rubber process oil comprising a base oil; a liquid olefin copolymer dissolvable in the base oil and prepared by copolymerization of ethylene with an alpha-olefin having 3 to 20 carbon atoms; polyisobutylene; and one or more additives selected from alkylated phosphonium phosphate compounds and butylhydroxybenzene-based compounds; and a rubber.

9. The rubber composition of claim 8, comprising 80 to 200 parts by weight of the rubber process oil per 100 parts by weight of the rubber.

10. The rubber composition of claim 8, wherein the rubber is a diene-based rubber.

11. The rubber composition of claim 10, wherein the diene-based rubber is one or more selected from among an ethylene propylene diene (EPDM) rubber, a butadiene rubber, a natural rubber, an isoprene rubber, a styrene butadiene rubber (SBR), a nitrile rubber (NBR), an isobutene-isoprene rubber (IIR), and a chloroprene rubber (CR).

* * * * *